(No Model.)
E. KAYE.
GLASS MELTING POT.
No. 426,820. Patented Apr. 29, 1890.
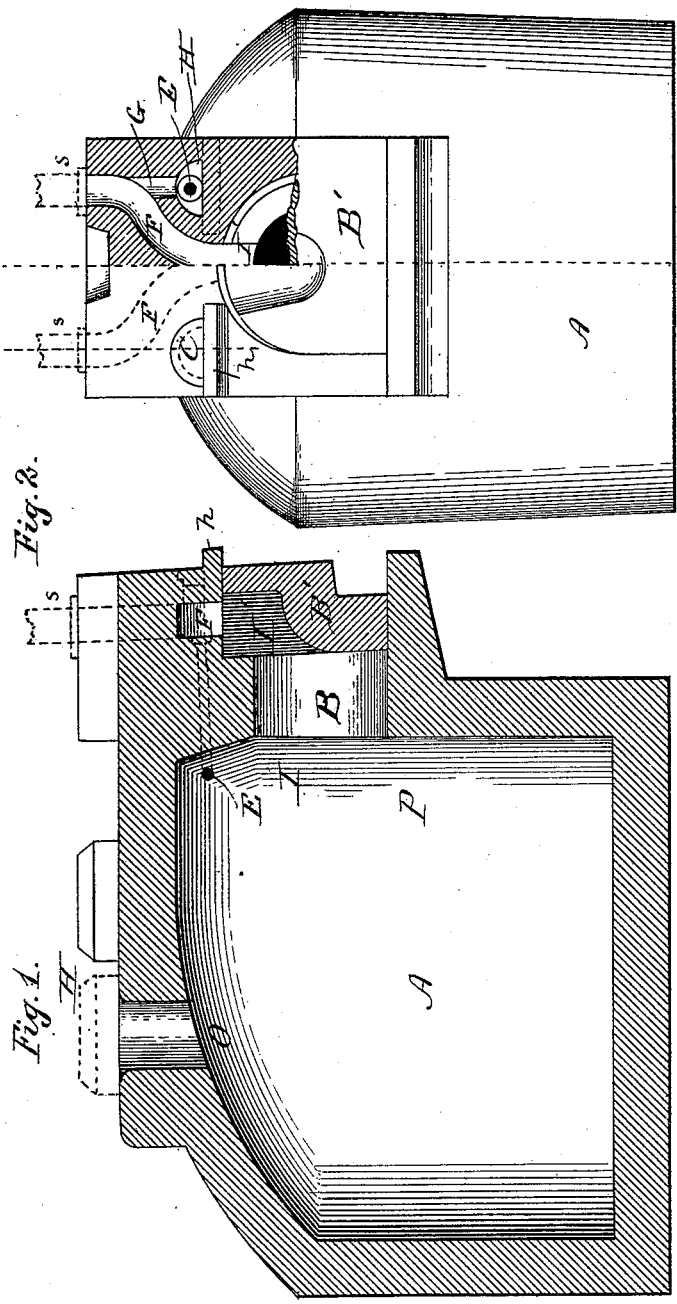
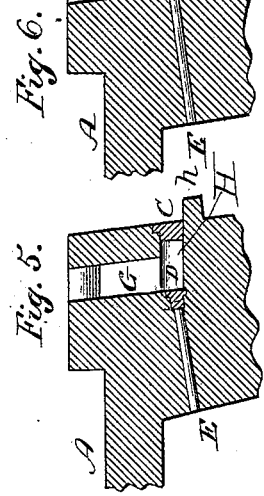
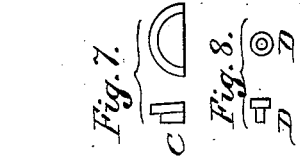
WITNESSES
Albert B. Blackwood
W<sup>m</sup> Clabaugh
INVENTOR
Edward Kaye
by Connolly Bros
attys

United States Patent Office.

EDWARD KAYE, OF WATER CURE, PENNSYLVANIA.

GLASS-MELTING POT.

SPECIFICATION forming part of Letters Patent No. 426,820, dated April 29, 1890.

Application filed November 13, 1889. Serial No. 330,173. (No model.)

*To all whom it may concern:*

Be it known that I, EDWARD KAYE, a citizen of the United States, residing at Water Cure, in the county of Beaver and State of Pennsylvania, have invented certain new and useful Improvements in Glass-Melting Pots; and I do hereby declare the following to be a full, clear, and exact description of the invention, reference being had to the accompanying drawings, which form part of this specification.

This invention has relation to glass-melting pots designed and adapted for use in glass-furnaces of the usual or any approved character, and has for its object the provision of a pot of novel construction, the characteristic features of which are a system of heat-conducting and draft flues, dampers, and deflectors, by means of which, first, the heating-flame is directed downward upon the batch and toward different outlet-points, accordingly as the batch becomes melted and reduced in bulk, and, secondly, the melting-pot is rapidly cooled in front by the heat-currents and flames being conducted away from the mouth of the pot when the stopper or gate is removed for the purpose of working the glass.

The invention consists in the novel construction of a glass-melting pot, as hereinafter described and claimed, and as shown in the accompanying drawings, wherein—

Figure 1 is a vertical longitudinal section of a pot embodying my invention. Fig. 2 is a front elevation with a portion of the pot broken away to show the arrangement of flues. Figs. 3, 4, 5, 6, 7, and 8 are detail views.

A designates the pot, of suitable size, shape, and general configuration, having the mouth B in front closed, while the glass is melting, by the gate or stopper B', and having in the top the hole O, through which the flame from the furnace enters to meet the glass or batch. The flame is deflected downward, back of the mouth of the pot, by the deflecting arch or bridge I, and the heat-currents and gases pass through the sinuous draft-flue I', formed partly in the body of the stopper B' and partly in the front wall of the pot. Above the mouth of the pot and in the hood of the pot the flue I' is branched laterally in two directions, as shown at F F, the latter passage communicating with the escape flues or stacks S S. From these branches supplementary flues G G dip into the recesses or cavities H, from the back portion of which lead small flues E E, furnished with stoppers D, while the open fronts are provided with doors or stoppers C, resting on flanges h h, projecting from the hood.

When the pot is charged and being heated, the pot-mouth B is closed and the flame and heat-currents pass downward through the opening O, and after deflection by the arch I pass out through the flue I' and branches F F to the stacks S S, the flues E E being closed by stoppers D D. When the batch is melted, the hole O is closed with the hood or cap H, so as to prevent the admission of the flames from the furnace, and the stopper B' is removed. The heated gases from the cavity of the pot now pass by the way of the mouth B into the flues F F in the hood above the mouth of the pot and escape through the stacks S S, instead of issuing from the mouth and blowing outward upon the workmen.

The heated gases above referred to are such as have come from the fire and remain in the pot after the hole O has been closed.

If desirable or necessary to rapidly reduce the temperature in front of the pot's mouth, the same is accomplished thus: The caps C C are removed, the stoppers D D taken out, and the caps C C replaced, thus providing additional escapes for the heat, which is further enabled to pass out through the flues E and dip-flues G G into the upper part of flues F F and thence to the stacks S S.

A glass-melting pot of the above-described construction has many advantages, and chiefly these, that the batch can be rapidly fused by the direct and economical means for deflecting the flames and heat-currents, and that the extreme heat of the pot may be rapidly reduced or diverted, so as to admit of access thereto for working.

Having described my invention, what I claim, and desire to secure by Letters Patent, is—

1. A glass-melting pot having in front the draft-flue I', leading from the chamber of the pot to an outlet-opening, the supplementary dip-flue G, communicating with said flue I' or a branch thereof, and the flue E, extending rearwardly from said dip-flue into the chamber of the pot and provided with the stopper D, the said pot being provided with the opening O in the top, substantially as described.

2. The glass-melting pot A, having the draft-flue I′, formed partly in the hood and partly in the stopper of the mouth, the branch flues F F thereof leading to the top of the pot, the dip-flues G G, leading from said branches to the cavities H H, the rearwardly-extending flues E E, communicating with the flues G G, the stoppers D, and the caps C, the said pot being provided with the opening O in the top, substantially as described.

3. A glass-melting pot provided with a stopper B′ to close its mouth and having a flue I′, leading from the cavity of the pot to an outlet flue or stack above the mouth and formed partly in the front wall of the pot and partly in the stopper B′, the said pot being provided with the opening O in the top, substantially as described.

In testimony that I claim the foregoing I have hereunto set my hand.

EDWARD KAYE.

Witnesses:
J. F. REED,
J. M. BEAL.